UNITED STATES PATENT OFFICE.

JULIUS BREDT, OF AIX-LA-CHAPELLE, GERMANY, ASSIGNOR TO THE FARBENFABRIKEN OF ELBERFELD COMPANY, OF NEW YORK.

BROMIN DERIVATIVE OF PHTHALIMID AND PROCESS OF MAKING SAME.

SPECIFICATION forming part of Letters Patent No. 621,319, dated March 21, 1899.

Application filed July 30, 1898. Serial No. 687,255. (No specimens.)

*To all whom it may concern:*

Be it known that I, JULIUS BREDT, professor of chemistry, residing at Aix-la-Chapelle, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

My invention relates to the production of a new brominated derivative from phtalimid which has the formula:

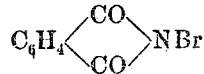

This process consists in general in treating the alkaline salts of phtalimid with bromin.

According to my researches this new compound exhibits in a high degree bactericide properties and represents, therefore, a valuable remedy for skin diseases and is intended to be used as a dusting-powder, &c.

In carrying out my invention practically I can proceed as follows, (the parts being by weight:) Twenty parts of phtalimid are dissolved by means of 6.4 parts of sodium hydrate and sixty parts of water. The resulting solution is stirred into an icy-cold mixture of 21.7 parts of bromin with two hundred parts of water. The new brominated derivative separates during this operation. When the whole alkaline solution of phtalimid has been added, the precipitate is filtered off, washed with ice-water, and dried at low temperatures. It can be further purified by recrystallization from chloroform or benzene.

When recrystallized from benzene, the new product represents a white crystalline powder which when heated in a capillary tube begins to liquefy at about 180° centigrade and melts completely at from 206° to 207° centigrade. If the new product is strongly heated, it is decomposed under evolution of bromin, while by the action of warm water it is decomposed according to the following equation:

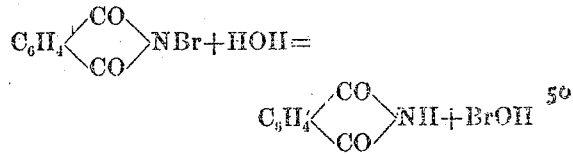

phtalimid and hypobromic acid (BrOH) being thus formed.

Having now described my invention and in what manner the same is to be performed, what I claim as new, and desire to secure by Letters Patent, is—

1. The process for producing a new brominated derivative from phtalimid which has the formula

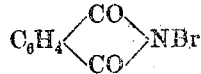

which process consists in first dissolving phtalimid in a dilute caustic lye, secondly stirring the resulting solution into a cold mixture prepared from bromin and water, thirdly filtering and finally drying the precipitate thus obtained at low temperatures, substantially as hereinbefore described.

2. As a new article of manufacture the new compound having the formula:

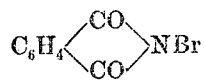

being, when recrystallized from benzene, a white crystalline powder, melting at from 206° to 207° centigrade, being decomposed under evolution of bromin when strongly heated, yielding phtalimid and hypobromic acid when treated with warm water and adapted for use against skin diseases.

In testimony whereof I have signed my name in the presence of two subscribing witnesses.

JULIUS BREDT.

Witnesses:
JOHN HECKMANNS,
FRANK M. BRUNDAGE.